Jan. 16, 1934.    W. H. RADFORD    1,943,551
MOTOR VEHICLE
Filed Dec. 16, 1930    2 Sheets-Sheet 1

INVENTOR.
William H. Radford
BY
ATTORNEYS

Jan. 16, 1934.  W. H. RADFORD  1,943,551
MOTOR VEHICLE
Filed Dec. 16, 1930   2 Sheets-Sheet 2

INVENTOR
William H. Radford
BY
ATTORNEYS

Patented Jan. 16, 1934

1,943,551

UNITED STATES PATENT OFFICE 1,943,551

MOTOR VEHICLE

William H. Radford, Peoria, Ill., assignor to Caterpillar Tractor Co., San Leandro, Calif., a corporation of California Application December 16, 1930. Serial No. 502,729

11 Claims. (Cl. 180—54)

My invention relates to improvement in motor vehicles and particularly to the means for supporting the radiator, and the objects of my improvement are, first, to provide an easily attachable support for a radiator; second, to provide a support for a radiator which can be made in one piece; third, to provide a means for supporting the radiator on the motor.

Figure 1:
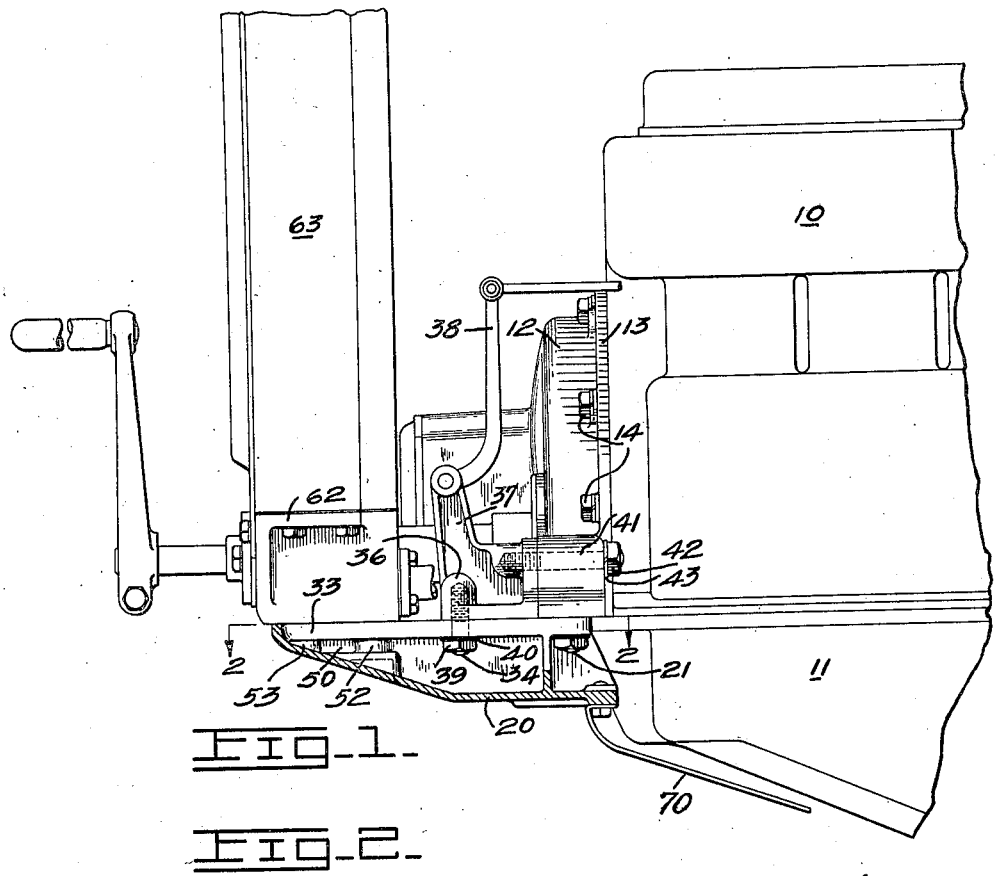
Fig. 1 is a side elevation of the front end of the vehicle with the radiator supporting bracket shown in section on line 1—1 of Fig. 2.
Figure 2:
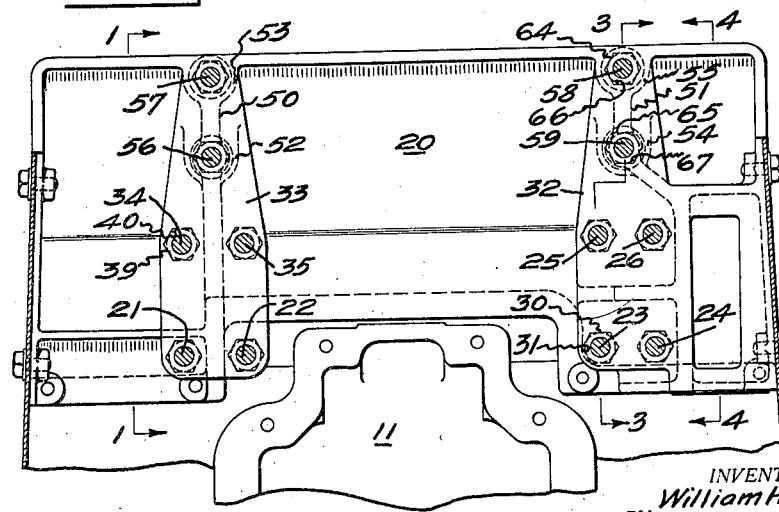
Fig. 2 is a sectional view on line 2—2 of Fig. 1.

The motor vehicle is provided with the usual motor 10 having a crankcase 11. To the front end of the motor is secured a housing 12 which is provided with flange 13 apertured to receive screws 14 which are threaded into a cylinder block as shown in Fig. 3.

Bracket 20 is secured to the under side of housing 12 by studs 21, 22, 23, 24, 25, 26 which are threaded at each end to receive nuts. As shown in Fig. 3, stud 23 carries nut 27 bearing on boss 28 in flange 29 of housing 12 and also nut 30 and washer 31 bearing against pad 32 formed on bracket 20. In the same manner, pad 32 is secured to housing 12 by studs 24, 25, 26 and their nuts, and pad 33 by studs 21, 22. Studs 34, 35 are threaded into bosses 36 formed on support 37 for governor arm 38 and project downwardly through apertures in pad 33 to receive nuts 39, washers 40. Stud 41 is horizontally disposed as shown in Fig. 1 and threaded into the rear side of support 37 and projects rearwardly through housing 12 to receive nut 42 and lock washer 43. By this means support 37 for governor arm 38 serves not only to support arm 38 but to assist in securing bracket 20 to housing 12.

Figure 3:
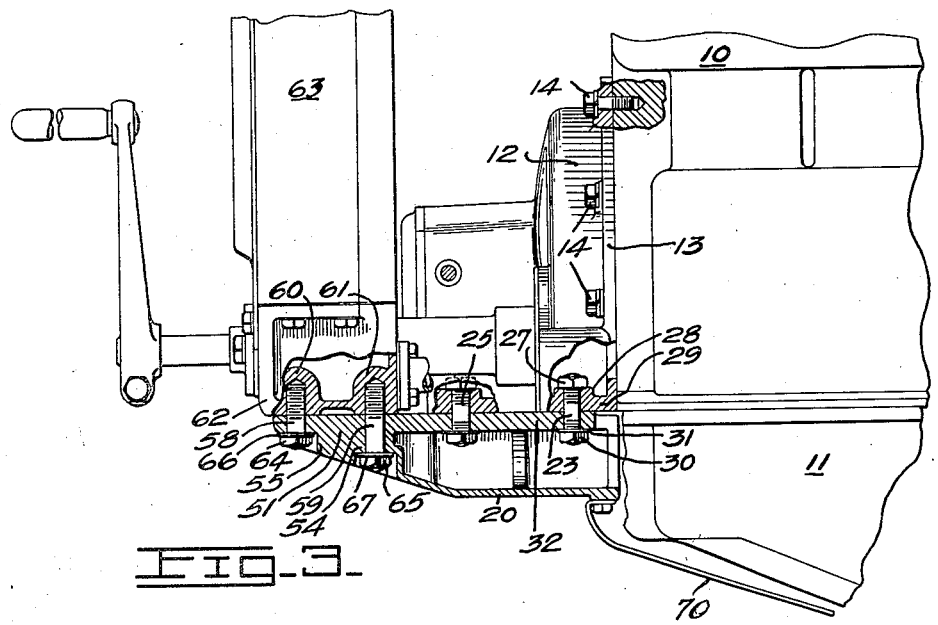
Fig. 3 is a view similar to Fig. 1 with a sectional view of the bracket on line 3—3 of Fig. 2.

Pads 32, 33 are suitably supported on webs, including webs 50, 51, in which are formed bosses 52, 53, 54, 55 which are apertured to receive studs 56, 57, 58, 59 which as shown in Fig. 3 are threaded into bosses 60, 61 formed in bottom header 62 of radiator 63. Studs 56, 57, 58, 59 project downwardly through apertures in bracket 20 to receive nuts 64, 65, and washers 66, 67. In this manner bracket 20 is rigidly secured to housing 12 and radiator 63 is rigidly secured to bracket 20.

This construction is particularly advantageous for use in motor vehicles of the tractor type in which the motor and transmission casings are bolted together to form a unit which is self-supporting and does not require a main frame. Furthermore, it will appear that the radiator is readily removable from the bracket and that the bracket in turn can be removed from the motor.

Figure 4:
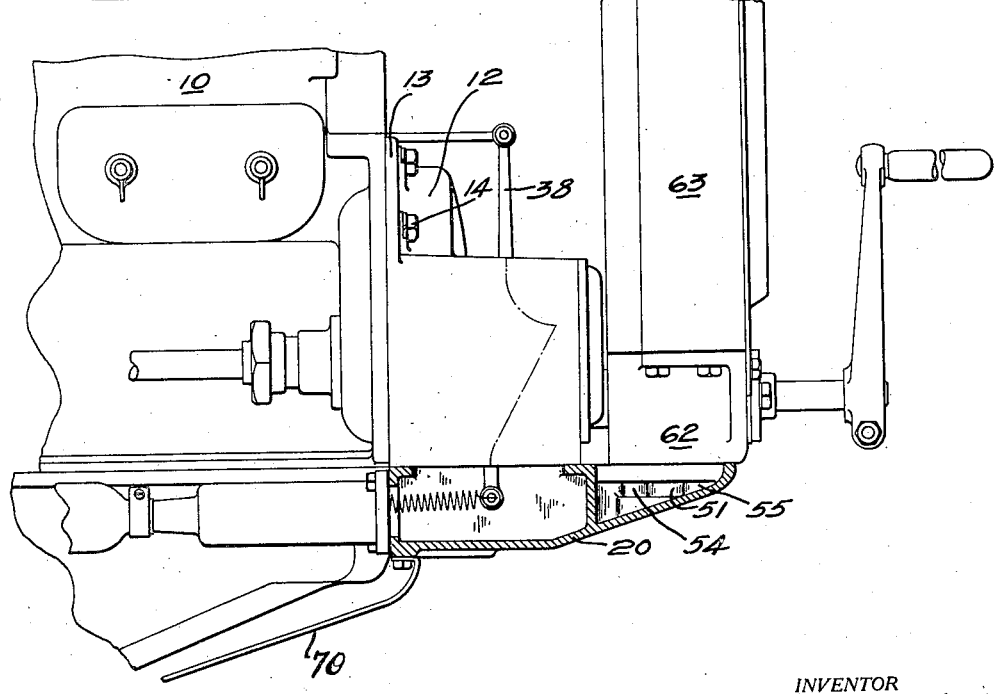
Fig. 4 is a right side elevation of the front end of the vehicle with a sectional view of the bracket on line 4—4 of Fig. 2.

With reference to Figs. 1, 3, and 4, it is to be observed that the bracket 20 also provides a support for a shield 70 which is rigidly and removably secured to the bracket by suitable bolts and nuts. The shield extends backwardly under crankcase 11, and protects the crankcase from injury by obstructions when the tractor happens to be operated among large rocks or boulders, piles of dirt and similar obstructed places.

I, therefore, claim as my invention:

1. In a motor vehicle, a motor, a housing secured thereto, a bracket separable from and secured to said housing as an independent unit, and a radiator supported on said bracket.

2. In a motor vehicle, a motor, a flanged housing removably attached to the front portion thereof, a support for auxiliary mechanism attached to said housing, and a bracket attached to said support and to said housing.

3. In a motor vehicle, a motor, a flanged housing removably attached to the front portion thereof, a support for auxiliary mechanism attached to said housing, a bracket attached to said support and to said housing, and a radiator secured to said bracket.

4. In a motor vehicle, a motor, a member attached to said motor, a support for auxiliary mechanism attached to said member, and a bracket attached to said support and to said member.

5. In a motor vehicle, a motor, a member attached to said motor, a support for auxiliary mechanism attached to said member, a bracket attached to said support and to said member, and a radiator supported by said bracket.

6. In a motor vehicle, a motor, a radiator bracket connected to said motor, a support for auxiliary mechanism, means for attaching said bracket to said support and to a member independent of said support.

7. In a motor vehicle, a motor, a radiator bracket, a radiator supported on said bracket adjacent one end thereof, means for connecting the bracket to the motor adjacent the opposite end of said bracket, and a crankcase shield connected to said bracket at said opposite end.

8. In a motor vehicle, a motor, a radiator, a crankcase shield, and means for mounting said radiator and said shield on said motor, including a member connecting said radiator to said motor, and means connecting said shield to said member at one end thereof.

9. In a motor vehicle, a motor, a housing secured thereto, a bracket separable from and secured to said housing as an independent unit, and a radiator supported on said bracket, said bracket having a planar radiator supporting and housing engaging surface.

10. In a motor vehicle, a motor, a housing secured thereto, a bracket separable from and secured to said housing as an independent unit, including apertured pads, a radiator on said pads, and securing means engaging said radiator and received in said pads.

11. In a motor vehicle, a motor, a housing secured thereto, a radiator, a radiator support, comprising a unitary structure, including a body portion, webs projecting from said body portion, pads on said webs, and means to secure said pads to said housing and said radiator to said pads.

WILLIAM H. RADFORD.